US011109367B2

(12) United States Patent
Lin

(10) Patent No.: US 11,109,367 B2
(45) Date of Patent: Aug. 31, 2021

(54) UPLINK CONTROL CHANNEL RESOURCE DETERMINING METHOD, TERMINAL, AND NETWORK SIDE DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/697,055

(22) Filed: Nov. 26, 2019

(65) Prior Publication Data
US 2020/0100243 A1 Mar. 26, 2020

Related U.S. Application Data

(63) Continuation of application No. PCT/CN2017/110255, filed on Nov. 9, 2017.

(51) Int. Cl.
*H04L 1/00* (2006.01)
*H04L 1/16* (2006.01)
(Continued)

(52) U.S. Cl.
CPC ......... *H04W 72/0413* (2013.01); *H04L 1/003* (2013.01); *H04L 1/1607* (2013.01);
(Continued)

(58) Field of Classification Search
CPC ......... H04W 72/0413; H04W 72/1268; H04W 72/044; H04W 72/0493; H04W 72/042;
(Continued)

(56) References Cited

U.S. PATENT DOCUMENTS

2003/0103481 A1 6/2003 Heo et al.
2012/0033648 A1 2/2012 Papasakellariou et al.
(Continued)

FOREIGN PATENT DOCUMENTS

CL 202000089 A1 5/2019
CL 202000090 A1 5/2019
(Continued)

OTHER PUBLICATIONS

International Search Report with English Translation for PCT/CN2017/110255, dated Dec. 29, 2017.
(Continued)

*Primary Examiner* — Moo Jeong

(57) ABSTRACT

An uplink control channel resource determining method, a terminal, and a network side device are provided. The terminal determines the number N of uplink control information bits to be transmitted; the terminal determines the number of first resources according to a target encoding rate and N; the terminal determines the number of resources actually used according to the number of the first resources and the number of pre-configured resources; and the terminal transmits the uplink control information by means of the number of resources actually used.

18 Claims, 2 Drawing Sheets

(51) Int. Cl.
  *H04L 1/18* (2006.01)
  *H04L 5/00* (2006.01)
  *H04W 72/04* (2009.01)
  *H04W 72/08* (2009.01)
  *H04W 72/12* (2009.01)
  *H04W 88/02* (2009.01)
  *H04W 88/08* (2009.01)

(52) U.S. Cl.
  CPC .......... *H04L 5/0044* (2013.01); *H04L 5/0053* (2013.01); *H04L 5/0064* (2013.01); *H04W 72/042* (2013.01); *H04W 72/044* (2013.01); *H04W 72/0493* (2013.01); *H04W 72/08* (2013.01); *H04W 72/1268* (2013.01)

(58) Field of Classification Search
  CPC ..... H04W 72/08; H04W 28/06; H04W 72/00; H04W 72/1284; H04L 5/0064; H04L 5/0053; H04L 5/0044; H04L 1/003; H04L 1/1607; H04L 1/0002
  See application file for complete search history.

(56) References Cited

U.S. PATENT DOCUMENTS

| | | | |
|---|---|---|---|
| 2013/0286948 | A1 | 10/2013 | Gao et al. |
| 2014/0301356 | A1 | 10/2014 | Wang |
| 2018/0124775 | A1 | 5/2018 | Seo et al. |
| 2018/0262377 | A1* | 9/2018 | Liu ........................ H04L 5/0057 |
| 2019/0059013 | A1* | 2/2019 | Rahman .................... H04L 1/00 |
| 2019/0140793 | A1* | 5/2019 | Takeda ..................... H04J 11/00 |
| 2019/0215826 | A1* | 7/2019 | Baldemair ............ H04L 1/0057 |
| 2020/0153538 | A1* | 5/2020 | Chen ..................... H04L 1/0023 |

FOREIGN PATENT DOCUMENTS

| | | |
|---|---|---|
| CL | 202000092 A1 | 5/2019 |
| CL | 202000093 A1 | 6/2019 |
| CL | 202000091 A1 | 7/2019 |
| CN | 101431774 A | 5/2009 |
| CN | 102104467 A | 6/2011 |
| CN | 102307082 A | 1/2012 |
| CN | 102404832 A | 4/2012 |
| CN | 103209483 A | 7/2013 |
| CN | 104469946 A | 3/2015 |
| CN | 104602346 A | 5/2015 |
| CN | 106257856 A | 12/2016 |
| CN | 106470089 A | 3/2017 |
| CN | 107027181 A | 8/2017 |
| EP | 1180907 A2 | 2/2002 |
| EP | 2178324 A1 | 4/2010 |
| EP | 2706795 A1 | 3/2014 |
| EP | 2882242 A2 | 6/2015 |
| RU | 2557164 C2 | 7/2015 |
| RU | 2557165 C1 | 7/2015 |
| WO | 2008157692 A2 | 12/2008 |
| WO | 2010018442 A2 | 2/2010 |
| WO | WO-2016122386 A2 * | 8/2016 ........... H04L 5/0057 |

OTHER PUBLICATIONS

Extended European Search Report for EP Application 18875114.3 dated Sep. 25, 2020.
Extended European Search Report for EP Application 17931430.7 dated Jun. 22, 2020.
Extended European Search Report for EP Application 18876639.8 dated Jun. 15, 2020.
Extended European Search Report for EP Application 18875359.4 dated Jun. 18, 2020.
Written Opinion of International Search Report for PCT/CN2018/114276 dated Jan. 16, 2019.
Written Opinion of International Search Report for PCT/CN2018/114345 dated Jan. 14, 2019.
Written Opinion of International Search Report for PCT/CN2018/114309 dated Jan. 18, 2019.
3GPP TSG RAN WG1 Meeting #90bis; Prague, Czech Republic, Oct. 9-13, 2017; R1-1717067.
3GPP TSG RAN WG1 Meeting 90bis; Prague, CZ, Oct. 9-13, 2017; R1-1717383.
3GPP TSG RAN WG1 #90bis; Prague, Czech Republic, Oct. 9-13, 2017; R1-1718305.
3GPP TSG RAN WGI Meeting #62; Madrid, Spain, Aug. 23-27, 2010; RI-104904.
3GPP TSG RAN WG1 Meeting 90bis; Prague, Czech, gth-135, Oct. 1, 2017; R1-1718621.
3GPP TSG RAN WG1 NR Ad-Hoc Meeting; Spokane, USA, Jan. 16-20, 2017; R1-1700568.
Communication pursuant to Article 94(3) EPC Examination for EP Application 18876639.8 dated Nov. 13, 2020.
Communication pursuant to Article 94(3) EPC Examination for EP Application 17931430.7 dated Nov. 3, 2020.
First China Office Action with English Translation for CN Application 201911414052.2 dated Nov. 3, 2020.
India First Office Action for IN Application 201917049709 dated Feb. 23, 2021.
Russia First Office Action with English Translation for RU Application 2019141762107(081429) dated Dec. 11, 2020.
Communication pursuant to Article 94(3) EPC Exam for EP Application 17931430.7 dated Mar. 25, 2021.
Communication pursuant to Article 94(3) EPC Exam for EP Application 18876639.8 dated Apr. 4, 2021.
India First Examination for IN Application 201917049667 dated Apr. 7, 2021.
CL First Office Action with English Translation for CL Application 2020-000092 dated Apr. 20, 2021.
CL First Office Action with English Translation for CL Application 2020-000089 dated Apr. 20, 2021.
India First Examination Report for IN Application 201917048778 dated Dec. May 12, 2021.
Communication Pursuant to Article 94(3) EPC Examination for EP Application 17931430.7 dated Jun. 30, 2021.
U.S. Non-Final Office Action for U.S. Appl. No. 16/625,471 dated Jun. 11, 2021.

* cited by examiner

US 11,109,367 B2

UPLINK CONTROL CHANNEL RESOURCE DETERMINING METHOD, TERMINAL, AND NETWORK SIDE DEVICE

CROSS-REFERENCE TO RELATED APPLICATION(S)

This application is a continuation application of International Application No. PCT/CN2017/110255 filed on Nov. 9, 2017, the entire disclosure of which is hereby incorporated by reference.

TECHNICAL FIELD

The present disclosure relates to the field of wireless communication, and more particular, to technologies for determining uplink control channel resources.

BACKGROUND

In order to ensure the demodulation performance of uplink control channels in a 5G New Radio (NR) system, a network device may respectively configure the maximum code rate of uplink control information being able to be carried by different terminals (the lower a code rate is, the larger a corresponding uplink coverage radius is, and the lower a probability that the terminal transmission power is limited).

In addition, it is determined in the NR that a resource corresponding to an uplink control channel for transmitting feedback response information is jointly indicated through a higher layer signaling and a dynamic signaling by a base station. That is, a plurality of available resources (time domain, frequency domain, code domain) are preconfigured through a higher layer signaling, and a dynamic signaling indicates one of them for actual transmission. Since a time/frequency domain size of a resource is semi-statically configured by a higher layer signaling, the flexibility is limited. When a value range of a size of uplink control information (UCI) actually transmitted is very large, transmission of the UCI using a preconfigured resource may cause a resource waste, i.e. when UCI bits are few, many frequency domain resources (PRBs) and/or time domain resources (symbols) are still occupied for transmission.

SUMMARY

A purpose of the present disclosure is to provide a method for determining uplink control channel resources, a terminal, and a network side device.

In order to solve the problem, the present disclosure discloses a method for determining uplink control channel resources, including: determining, by a terminal, a quantity N of bits of uplink control information to be transmitted; determining, by the terminal, a first quantity of resources according to a target code rate and the N; determining, by the terminal, a quantity of resources to be actually used according to the first quantity of resources and a quantity of preconfigured resources, wherein the quantity of the resources to be actually used is not greater than the quantity of the preconfigured resources; and transmitting, by the terminal, uplink control information using the quantity of the resources to be actually used.

In an implementation, the determining, by the terminal, the quantity of the resources to be actually used according to the first quantity of resources and the quantity of the preconfigured resources, includes: determining, by the terminal, the quantity of the resources to be actually used and uplink control information to be actually transmitted according to the first quantity of resources and the quantity of the preconfigured resources, wherein a quantity of bits of the uplink control information to be actually transmitted is not greater than N.

In an implementation, the target code rate is configured by a network side device.

In an implementation, the quantity of the preconfigured resources and the first quantity of resources include: a quantity of frequency domain resource blocks occupied by an uplink control channel; or a quantity of resource elements occupied by an uplink control channel.

In an implementation, the quantity of the preconfigured resources is determined by one of the following manners: indicating through a higher layer signaling; or preconfiguring at least one available resource through a higher layer signaling, and indicating one of the at least one available resource through downlink control information.

In an implementation, the determining, by the terminal, the quantity of the resources to be actually used according to the first quantity of resources and the quantity of the preconfigured resources, includes: when the first quantity of resources is not greater than the quantity of the preconfigured resources, the quantity of the resources to be actually used is equal to the first quantity of resources.

In an implementation, the terminal determines that the resources to be actually used are first Q resources of the preconfigured resources, and the Q is the first quantity of resources.

In an implementation, the determining, by the terminal, the quantity of the resources to be actually used according to the first quantity of resources and the quantity of the preconfigured resources, includes: when the first quantity of resources is greater than the quantity of the preconfigured resources, the quantity of the resources to be actually used is equal to the quantity of the preconfigured resources.

In an implementation, in the act of the terminal transmitting the uplink control information using the quantity of the resources to be actually used, what is transmitted is the uplink control information to be transmitted.

In an implementation, the determining, by the terminal, the quantity of the resources to be actually used according to the first quantity of resources and the quantity of the preconfigured resources, includes: when the first quantity of resources is greater than the quantity of the preconfigured resources, the terminal determines a first quantity of bits of uplink control information according to the target code rate and the quantity of the preconfigured resources.

In an implementation, the determining, by the terminal, the first quantity of bits of the uplink control information according to the target code rate and the quantity of the preconfigured resources, includes: performing signaling compression on the uplink control information to be transmitted, and obtaining new uplink control information to be transmitted, wherein a quantity of bits of the new uplink control information to be transmitted is not greater than the first quantity of bits of the uplink control information.

In an implementation, the obtaining the new uplink control information to be transmitted, further includes: the quantity of the resources to be actually used is equal to the quantity of the preconfigured resources.

In an implementation, the obtaining the new uplink control information to be transmitted, further includes: determining, by the terminal, a second quantity of resources according to the target code rate and the quantity of bits of the new uplink control information to be transmitted;

wherein the quantity of the resources to be actually used is equal to the second quantity of resources.

In an implementation, the transmitted uplink control information is the new uplink control signal to be transmitted.

The present disclosure further discloses a method for determining uplink control channel resources, including: determining, by a network side device, a quantity N of bits of uplink control information to be received; determining, by the network side device, a first quantity of resources according to a target code rate and the N; determining, by the network side device, a quantity of resources to be actually used according to the first quantity of resources and a quantity of preconfigured resources, wherein the quantity of the resources to be actually used is not greater than the quantity of the preconfigured resources; and receiving, by the network side device, uplink control information using the quantity of the resources to be actually used.

In an implementation, the quantity of the preconfigured resources and the first quantity of resources include: a quantity of frequency domain resource blocks occupied by an uplink control channel; or a quantity of resource elements occupied by an uplink control channel.

In an implementation, the quantity of the preconfigured resources is determined by one of the following manners: indicating through a higher layer signaling; or preconfiguring at least one available resource through a higher layer signaling, and indicating one of the at least one available resource through downlink control information.

In an implementation, the determining, by the network side device, the quantity of resources to be actually used according to the first quantity of resources and the quantity of preconfigured resources, includes: when the first quantity of resources is not greater than the quantity of the preconfigured resources, the quantity of the resources to be actually used is equal to the first quantity of resources.

In an implementation, the resources to be actually used are first Q resources of the preconfigured resources, and the Q is the first quantity of resources.

In an implementation, the determining, by the network side device, the quantity of resources to be actually used according to the first quantity of resources and the quantity of preconfigured resources, includes: when the first quantity of resources is greater than the quantity of the preconfigured resources, the quantity of the resources to be actually used is equal to the quantity of the preconfigured resources.

In an implementation, in the act of receiving, by the network side device, the uplink control information using the quantity of the resources to be actually used, what is received is the uplink control information to be received.

In an implementation, the determining, by the network side device, the quantity of resources to be actually used according to the first quantity of resources and the quantity of preconfigured resources, includes: determining, by the network side device, a first quantity of bits of uplink control information according to the target code rate and the quantity of the preconfigured resources when the first quantity of resources is greater than the quantity of the preconfigured resources.

In an implementation, the determining, by the network side device, the first quantity of bits of the uplink control information according to the target code rate and the quantity of the preconfigured resources, includes: the quantity of the resources to be actually used is equal to the quantity of the preconfigured resources.

In an implementation, the determining, by the network side device, the first quantity of bits of the uplink control information according to the target code rate and the quantity of the preconfigured resources, includes: determining, by the network side device, a second quantity of resources according to the target code rate and a quantity of bits of new uplink control information to be transmitted, wherein the new uplink control information to be transmitted is obtained after signaling compression is performed on the uplink control information to be transmitted, and the quantity of bits of the new uplink control information to be transmitted is not greater than the first quantity of bits of the uplink control information; and the quantity of the resources to be actually used is equal to the second quantity of resources.

The present disclosure further discloses a terminal, which includes: a signaling bit quantity determination module, used for determining a quantity N of bits of uplink control information to be transmitted; a first quantity of resources determination module, used for determining a first quantity of resources according to a target code rate and the N; a practical resource quantity determination module, used for determining a quantity of resources to be actually used according to the first quantity of resources and a quantity of preconfigured resources, wherein the quantity of the resources to be actually used is not greater than the quantity of the preconfigured resources; and a transmission module, used for transmitting uplink control information by using the quantity of the resources to be actually used.

In an implementation, the practical resource quantity determination module is further used for determining the quantity of the resources to be actually used and uplink control information to be actually transmitted according to the first quantity of resources and the quantity of the preconfigured resources, wherein a quantity of bits of the uplink control information to be actually transmitted is not greater than N.

In an implementation, the target code rate is configured by a network side device; the quantity of the preconfigured resources and the first quantity of resources include: a quantity of frequency domain resource blocks occupied by an uplink control channel; or a quantity of resource elements occupied by an uplink control channel.

In an implementation, the quantity of the preconfigured resources is determined by one of the following manners: indicating through a higher layer signaling; or preconfiguring at least one available resource through a higher layer signaling, and indicating one of the at least one available resource through downlink control information.

In an implementation, the practical resource quantity determination module is further used for, when the first quantity of resources is not greater than the quantity of the preconfigured resources, the quantity of the resources to be actually used is equal to the first quantity of resources.

In an implementation, the terminal determines that the resources to be actually used are first Q resources of the preconfigured resources, and the Q is the first quantity of resources.

In an implementation, the practical resource quantity determination module is further used for, when the first quantity of resources is greater than the quantity of the preconfigured resources, the quantity of the resources to be actually used is equal to the quantity of the preconfigured resources.

In an implementation, what the transmission module transmits is the uplink control information to be transmitted.

In an implementation, the practical resource quantity determination module is further used for determining a first quantity of bits of uplink control information according to the target code rate and the quantity of the preconfigured resources when the first quantity of resources is greater than the quantity of the preconfigured resources.

In an implementation, further including: a signaling compression module, used for performing signaling compression on the uplink control information to be transmitted, and obtaining new uplink control information to be transmitted, wherein a quantity of bits of the new uplink control information to be transmitted is not greater than the first quantity of bits of the uplink control information.

In an implementation, the quantity of the resources to be actually used is equal to the quantity of the preconfigured resources; or the terminal determines a second quantity of resources according to the target code rate and the quantity of bits of the new uplink control information to be transmitted; wherein the quantity of the resources to be actually used is equal to the second quantity of resources.

In an implementation, the uplink control information transmitted by the transmission module is the new uplink control information to be transmitted.

The present disclosure further discloses a network side device, which includes: a signaling bit quantification module, used for determining a quantity N of bits of uplink control information to be received; a first resource quantification module, used for determining a first quantity of resources according to a target code rate and the N; a practical resource quantification module, used for determining a quantity of resources to be actually used according to the first quantity of resources and a quantity of preconfigured resources, wherein the quantity of the resources to be actually used is not greater than the quantity of the preconfigured resources; and a receiving module, used for receiving uplink control information using the quantity of the resources to be actually used.

In an implementation, the quantity of the preconfigured resources and the first quantity of resources include: a quantity of frequency domain resource blocks occupied by an uplink control channel; or a quantity of resource elements occupied by an uplink control channel.

In an implementation, the quantity of the preconfigured resources is determined by one of the following manners: indicating through a higher layer signaling; or preconfiguring at least one available resource through a higher layer signaling, and indicating one of the at least one available resource through downlink control information.

In an implementation, the practical resource quantification module is further used for, when the first quantity of resources is not greater than the quantity of the preconfigured resources, the quantity of the resources to be actually used is equal to the first quantity of resources.

In an implementation, the resources to be actually used are first Q resources of the preconfigured resources, and the Q is the first quantity of resources.

In an implementation, the practical resource quantification module is further used for, when the first quantity of resources is greater than the quantity of the preconfigured resources, the quantity of the resources to be actually used is equal to the quantity of the preconfigured resources.

In an implementation, what the receiving module receives is the uplink control information to be received.

In an implementation, the practical resource quantification module is further used for, the network side device determines a first quantity of bits of uplink control information according to the target code rate and the quantity of the preconfigured resources when the first quantity of resources is greater than the quantity of the preconfigured resources.

In an implementation, the quantity of the resources to be actually used is equal to the quantity of the preconfigured resources.

In an implementation, the practical resource quantification module is further used for determining a second quantity of resources according to the target code rate and a quantity of bits of new uplink control information to be transmitted, wherein the new uplink control information to be transmitted is obtained after signaling compression is performed on the uplink control information to be transmitted, and the quantity of bits of the new uplink control information to be transmitted is not greater than the first quantity of bits of the uplink control information; and the quantity of the resources to be actually used is equal to the second quantity of resources.

Compared with the related art, the implementations of the present disclosure may effectively prevent the problem of waste of time-frequency resources when a value range of a size of UCI actually transmitted is very large.

A large number of technical features are recorded in the specification of the present disclosure and distributed in various technical solutions. If all possible combinations of technical features (i.e. technical solutions) of the present disclosure are listed, the specification will be too lengthy. In order to avoid the problem, various technical features disclosed in the summary of the present disclosure, various technical features disclosed in the following implementations and examples, and various technical features disclosed in the drawings may be freely combined with each other to form various new technical solutions (all of which are deemed to have been recorded in the specification), unless such combination of technical features is not technically feasible. For example, if feature A+B+C is disclosed in one example, feature A+B+D+E is disclosed in another example, and features C and D are equivalent technical means that play the same role, and technically, one of C and D may be chosen and C and D cannot be used at the same time, and feature E may be technically combined with feature C, then the solution of A+B+C+D should not be considered as already recorded because of technical infeasibility, while the solution of A+B+C+E should be considered as already recorded.

DETAILED DESCRIPTION

In the following description, many technical details are set forth in order to enable readers to better understand the present disclosure. However, one of ordinary skill in the art may understand that technical solutions claimed in the present disclosure may be realized even without these technical details and various variations and modifications based on the following implementations.

Description of some concepts is as follows.

5G: 5th Generation Mobile Communication Technology.

NR: Radio Access Part of 5G (5th Generation Mobile Communication Technology), abbreviation for New Radio.

PUCCH: abbreviation for Physical Uplink Control Channel.

SR: uplink Scheduling Request, abbreviation for Scheduling Request.

OFDM: abbreviation for Orthogonal Frequency Division Multiplexing.

UCI: abbreviation for Uplink control information.

PRB: abbreviation for Physical Resource Block.

The following outlines some of innovations of the present disclosure.

A terminal determines a first quantity of resources according to the quantity N of bits of uplink control information to be transmitted and a target code rate, and if the first quantity of resources is less than or equal to a quantity of preconfigured resources, the first quantity of resources is used as a quantity of resources to be actually used to transmit the N-bit uplink control information. If the first quantity of resources is greater than the quantity of the preconfigured resources, then an upper limit of a quantity of bits of uplink control information allowed to be transmitted by the quantity of the preconfigured resources is determined. According to the upper limit and the target code rate, the quantity T of bits of the uplink control information to be transmitted (at this time, a specific content of the uplink control information is also changed correspondingly) is re-determined by means of signaling compression, etc. (a specific manner of signaling compression is not limited in the present disclosure). Then, the previous N is replaced by the T and the method is iterated to finally determine the quantity of the resources to be actually used. In this way, a problem of resource waste caused by mismatch between a semi-statically determined quantity of pre-configured resources and the quantity of the resources actually used is avoided.

The above contents are only some innovations of the present disclosure, and other innovations and many variations are described in detail in the following implementations.

In order to make objects, technical solutions, and advantages of the present disclosure clearer, the implementations of the present disclosure will be described in further detail below with reference to the accompanying drawings.

Figure 1:
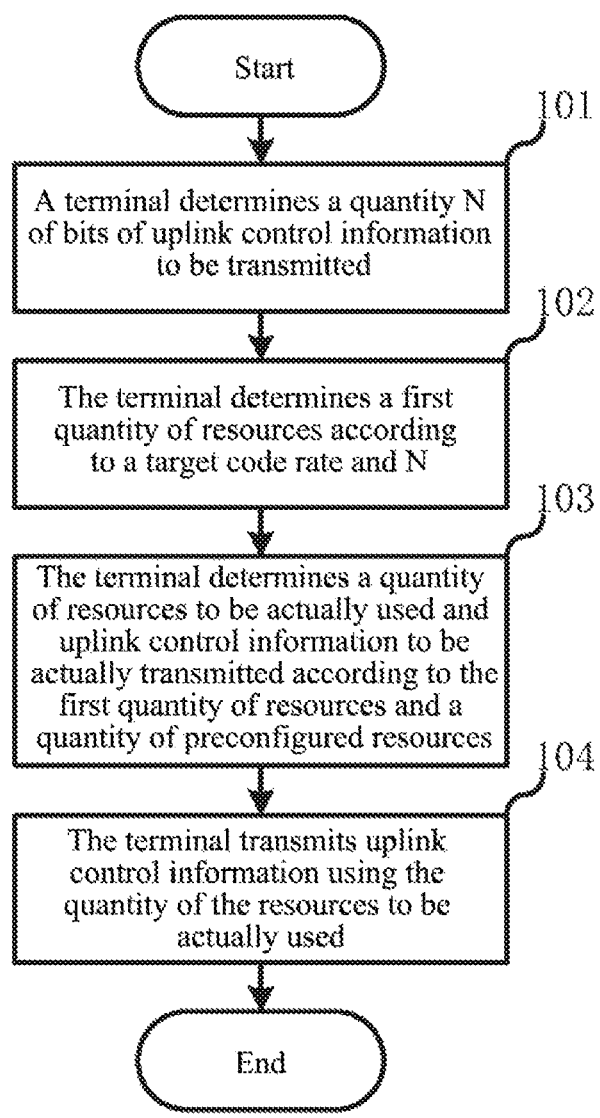
FIG. 1 is a flowchart of a method for determining uplink control channel resources in a first implementation of the present disclosure.

A first implementation of the present disclosure relates to a method for determining uplink control channel resources. FIG. 1 is a flowchart of the method for determining uplink control channel resources. The method for determining uplink control channel resources includes acts 101-104.

In act 101, a terminal determines a quantity N of bits of uplink control information to be transmitted, wherein N is a positive integer.

After that, entering act 102, the terminal determines a first quantity of resources according to a target code rate and N. In at least one implementation, the target code rate may be configured by a network side device. In at least one implementation, the target code rate may be predetermined according to a protocol.

After that, entering act 103, the terminal determines a quantity of resources to be actually used and uplink control information to be actually transmitted according to the first quantity of resources and a quantity of preconfigured resources, wherein the quantity of the resources to be actually used is not greater than the quantity of the preconfigured resources and a quantity of bits of uplink control information to be actually transmitted is not greater than N. The act of determining the uplink control information to be actually transmitted is optional, or in other words, only the quantity of the resources to be actually used may be determined, and the uplink control information to be actually transmitted may be the uplink control information to be transmitted without re-determination.

After that, entering act 104, the terminal transmits uplink control information using the quantity of the resources to be actually used. In at least one implementation, what is actually transmitted is the uplink control information to be transmitted initially. In at least one implementation, what is actually transmitted is new uplink control information after a processing such as signaling compression.

When a value range of a size of UCI actually transmitted is very large, the problem of waste of time-frequency resources may be effectively prevented.

Terminals may be various, such as smart phones, tablet computers, desktop computers, notebook computers, customized wireless terminals, Internet of Things nodes, wireless communication modules, etc., as long as wireless communication may be performed with a network side according to an agreed communication protocol.

There are many possibilities for the quantity of the preconfigured resources and the first quantity of resources, for example, a quantity of frequency domain resource blocks occupied by an uplink control channel, a quantity of resource elements occupied by an uplink control channel, etc.

There are many ways for determining the quantity of the preconfigured resources, for example, indicating through a higher layer signaling; or, preconfiguring at least one available resource through a higher layer signaling, and indicating one of the at least one available resource through downlink control information.

The act 103 may be implemented in various ways. The following are examples.

In at least one implementation, when the first quantity of resources is not greater than the quantity of the preconfigured resources, the quantity of the resources to be actually used is equal to the first quantity of resources (assuming that the first quantity of resources is Q), wherein the resources to be actually used may be first Q resources, last Q resources, or Q resources in other agreed positions of the preconfigured resources, etc.

In at least one implementation, when the first quantity of resources is greater than the quantity of the preconfigured resources, the quantity of the resources to be actually used is equal to the quantity of the preconfigured resources. At this time, the uplink control information to be transmitted (i.e., the N-bit uplink control information to be transmitted in the act 101) is transmitted in the act 104.

In at least one implementation, when the first quantity of resources is greater than the quantity of the preconfigured resources, the terminal determines a first quantity of bits of uplink control information according to the target code rate and the quantity of the preconfigured resources. Signaling compression needs to be performed on the uplink control information to be transmitted to obtain new uplink control information to be transmitted, and a quantity of bits of the new uplink control information to be transmitted is less than or equal to the first quantity of bits of the uplink control information. The quantity of the resources to be actually used is equal to the quantity of the preconfigured resources.

In at least one implementation, when the first quantity of resources is greater than the quantity of the preconfigured resources, the terminal determines a first quantity of bits of uplink control information according to the target code rate and the quantity of the preconfigured resources. Signaling compression needs to be performed on the uplink control information to be transmitted to obtain new uplink control information to be transmitted, and a quantity of bits of the new uplink control information to be transmitted is less than or equal to the first quantity of bits of the uplink control information. Further, replacing a position of N in the act 101 with the quantity T of bits of the new uplink control information to be transmitted, the entire flow returns from the act 103 to the act 101. Specifically, the terminal determines a second quantity of resources according to the target code rate and the quantity of bits of the new uplink control information to be transmitted. The quantity of the resources to be actually used is equal to the second quantity of resources. The transmitted uplink control information is the new uplink control information to be transmitted.

In order to explain the implementation more clearly and in detail, several specific examples are described below.

Implementation one: the terminal determines that a target code rate is $r_{max}=1/2$, and a quantity N of bits of uplink control information to be transmitted is equal to 8. The quantity of the preconfigured resources is 2 PRBs (each PRB includes 12 carriers). The terminal uses 2 symbols of PUCCH to transmit uplink control information (i.e. occupying 2 time domain symbols), wherein overhead of reference signals contained in the PUCCH is 1/3, and the PUCCH adopts QPSK modulation, and a corresponding modulation level Q is equal to 2.

The terminal determines that the first quantity of resources is $$\left\lceil \frac{N}{r_{max} \cdot Q \cdot N_{UCI\_RE}} \right\rceil = \left\lceil \frac{8}{1/2 \cdot 2 \cdot (12 \cdot 2 \cdot 2/3)} \right\rceil = 1,$$

wherein $N_{UCI\_RE}$ is a quantity of REs occupied by UCI in a PRB.

The first quantity of resources is less than the quantity of the preconfigured resources, and the terminal determines to transmit the uplink control information using one PRB.

Implementation two: the terminal determines that a target code rate is $r_{max}=1/8$, and a quantity N of bits of uplink control information to be transmitted is equal to 10. The quantity of the preconfigured resources is 2 PRBs (each PRB includes 12 carriers). The terminal uses 2 symbols of PUCCH to transmit uplink control information (i.e. occupying 2 time domain symbols), wherein overhead of reference signals contained in the PUCCH is 1/3, and the PUCCH adopts QPSK modulation, and a corresponding modulation level Q is equal to 2.

The terminal determines that the first quantity of resources is $$\left\lceil \frac{N}{r_{max} \cdot Q \cdot N_{UCI\_RE}} \right\rceil = \left\lceil \frac{10}{1/8 \cdot 2 \cdot (12 \cdot 2 \cdot 2/3)} \right\rceil = 3,$$

wherein $N_{UCI\_RE}$ is a quantity of REs occupied by UCI in a PRB.

The first quantity of resources is greater than the quantity of the preconfigured resources, and the terminal determines that the first quantity of bits of the uplink control information is $T=\lfloor r_{max} \cdot Q \cdot N_{UCI\_RE} \cdot N_{configured} \rfloor = \lfloor 1/8 \cdot 2 \cdot (12 \cdot 2 \cdot 2/3) \cdot 2 \rfloor = 8$, wherein $N_{configured}$ is the quantity of the preconfigured resources.

The terminal compresses the bits of the uplink control information to be transmitted to obtain new uplink control information to be transmitted, of which a quantity of bits is not greater than 8. The terminal transmits the new uplink control information to be transmitted.

Implementation three: based on the Implementation two, if due to limitation of UCI compression manner, the terminal determines that a quantity of bits of an uplink control information to be actually transmitted is $T < \lfloor r_{max} \cdot Q \cdot N_{UCI\_RE} \cdot N_{configured} \rfloor$, and it is assumed that T=4.

The terminal further determines a quantity of resources actually needed to transmit the 4-bit uplink control information $$\left\lceil \frac{N}{r_{max} \cdot N_{UCI\_RE}} \right\rceil = \left\lceil \frac{4}{1/8 \cdot 2 \cdot (12 \cdot 2 \cdot 2/3)} \right\rceil = 1.$$

The terminal determines to use one PRB to transmit the 4-bit compressed uplink control information.

A second implementation of the present disclosure relates to a method for determining uplink control channel resources.

Figure 2:
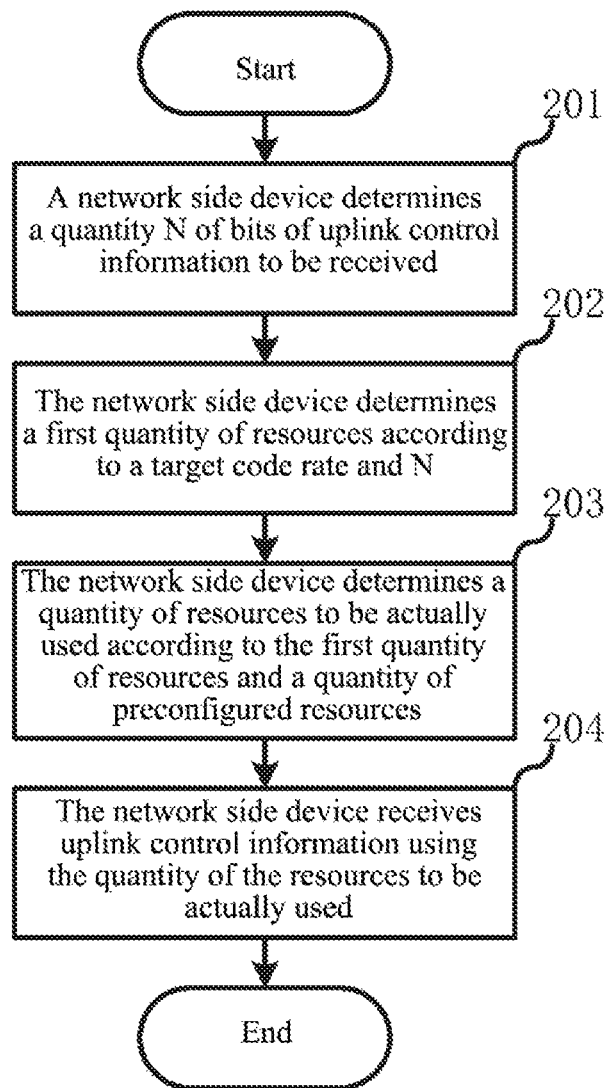
FIG. 2 is a flowchart of a method for determining uplink control channel resources in a second implementation of the present disclosure.

The first implementation is a method at a terminal side for determining uplink control channel resources, and the second implementation is a method at a network side for determining uplink control channel resources. Technical concepts of the two implementations are the same, but locations of the implementations are different, and relevant details may be used interchangeably. FIG. 2 is a flowchart of the method for determining uplink control channel resources.

In act 201, a network side device determines a quantity N of bits of uplink control information to be received, wherein N is a positive integer.

After that, entering act 202, the network side device determines a first quantity of resources according to a target code rate and N. In at least one implementation, the target code rate may be configured by a network side device. In at least one implementation, the target code rate may be predetermined according to a protocol.

After that, entering act 203, the network side device determines a quantity of resources to be actually used according to the first quantity of resources and a quantity of preconfigured resources, wherein the quantity of the resources to be actually used is not greater than the quantity of the preconfigured resources.

After that, entering act 204, the network side device receives uplink control information using the quantity of the resources to be actually used.

There are many possibilities for the quantity of the preconfigured resources and the first quantity of resources, for example, a quantity of frequency domain resource blocks occupied by an uplink control channel, a quantity of resource elements occupied by an uplink control channel, etc.

There are many ways for determining the quantity of the preconfigured resources, for example, indicating through a higher layer signaling; or, preconfiguring at least one available resource through a higher layer signaling, and indicating one of the at least one available resource through downlink control information.

The act 203 may be implemented in various ways. The following are examples.

In at least one implementation, when the first quantity of resources is not greater than the quantity of the preconfigured resources, the quantity of the resources to be actually used is equal to the first quantity of resources (assuming that the first quantity of resources is Q), wherein the resources to be actually used may be first Q resources, last Q resources, or Q resources in other agreed positions of the preconfigured resources, etc.

In at least one implementation, when the first quantity of resources is greater than the quantity of the preconfigured resources, the quantity of the resources to be actually used is equal to the quantity of the preconfigured resources. In this case, in the act 204, what is actually received is uplink control information of N bits.

In at least one implementation, when the first quantity of resources is greater than the quantity of the preconfigured resources, the network side device determines a first quantity of bits of uplink control information according to the target code rate and the quantity of the preconfigured resources. The quantity of the resources to be actually used is equal to the quantity of the preconfigured resources. In this case, in the act 204, what is actually received is uplink control information after signaling compression.

In at least one implementation, when the first quantity of resources is greater than the quantity of the preconfigured resources, the network side device determines a first quantity of bits of uplink control information according to the target code rate and the quantity of the preconfigured resources. The network side device determines a second quantity of resources according to the target code rate and a quantity of bits of new uplink control information to be received, wherein the new uplink control information to be received is obtained after signaling compression is performed on the uplink control information to be received, and the quantity of bits of the new uplink control information to be received is not greater than the first quantity of bits of the uplink control information. The quantity of the resources to be actually used is equal to the second quantity of resources. In this case, actually iteration is performed by returning to the act 201 according to the quantity of bits (replacing N in the act 201) of the new uplink control information to be received after signaling compression.

A third implementation of the present disclosure relates to a terminal. The terminal includes following modules.

A signaling bit quantity determination module is used for determining a quantity N of bits of uplink control information to be transmitted.

A first quantity of resources determination module is used for determining a first quantity of resources according to a target code rate and N. In at least one implementation, the target code rate may be configured by a network side device. In at least one implementation, the target code rate may be predetermined according to a protocol.

A practical resource quantity determination module is used for determining a quantity of resources to be actually used and uplink control information to be actually transmitted according to the first quantity of resources and a quantity of preconfigured resources, wherein the quantity of the resources to be actually used is not greater than the quantity of the preconfigured resources and a quantity of bits of the uplink control information to be actually transmitted is not greater than N. The determination for the uplink control information to be actually transmitted is optional.

A signaling compression module is used for performing signaling compression on the uplink control information to be transmitted to obtain new uplink control information to be transmitted. The signaling compression module is optional.

A transmission module is used for transmitting uplink control information by using the quantity of the resources to be actually used. In at least one implementation, what is actually transmitted is uplink control information to be transmitted initially. In at least one implementation, what is actually transmitted is new uplink control information after a processing such as signaling compression.

There are many possibilities for the quantity of the preconfigured resources and the first quantity of resources, for example, a quantity of frequency domain resource blocks occupied by an uplink control channel, a quantity of resource elements occupied by an uplink control channel, etc.

There are many ways for determining the quantity of the preconfigured resources, for example, indicating through a higher layer signaling; or, preconfiguring at least one available resource through a higher layer signaling, and indicating one of the at least one available resource through downlink control information.

The practical resource quantity determination module has many ways for implementation, and the following are examples.

In at least one implementation, when the practical resource quantity determination module determines that the first quantity of resources is not greater than the quantity of the preconfigured resources, the quantity of the resources to be actually used is equal to the first quantity of resources (assuming that the first quantity of resources is Q), wherein the resources to be actually used may be first Q resources, last Q resources, or Q resources in other agreed positions of the preconfigured resources, etc.

In at least one implementation, when the practical resource quantity determination module determines that the first quantity of resources is greater than the quantity of the preconfigured resources, the quantity of the resources to be actually used is equal to the quantity of the preconfigured resources. In this case, what the transmission module transmits is the uplink control information to be transmitted.

In at least one implementation, when the practical resource quantity determination module determines that the first quantity of resources is greater than the quantity of the preconfigured resources, the terminal determines a first quantity of bits of uplink control information according to the target code rate and the quantity of the preconfigured resources. In this case, the signaling compression module performs signaling compression on the uplink control information to be transmitted to obtain the new uplink control information to be transmitted, wherein a quantity of bits of the new uplink control information to be transmitted is not greater than the first quantity of bits of the uplink control information. The quantity of the resources to be actually used is equal to the quantity of the preconfigured resources.

In at least one implementation, when the practical resource quantity determination module determines that the first quantity of resources is greater than the quantity of the preconfigured resources, the terminal determines a first quantity of bits of uplink control information according to the target code rate and the quantity of the preconfigured resources. In this case, the signaling compression module performs signaling compression on the uplink control information to be transmitted to obtain the new uplink control information to be transmitted, wherein a quantity of bits of the new uplink control information to be transmitted is not greater than the first quantity of bits of the uplink control information. The terminal determines a second quantity of resources according to the target code rate and the quantity of bits of the new uplink control information to be transmitted. The quantity of the resources to be actually used is equal to the second quantity of resources. The uplink control information transmitted by the transmission module is the new uplink control information to be transmitted.

The first implementation is a method implementation corresponding to the implementation, and the implementation may be implemented in cooperation with the first implementation. The relevant technical details mentioned in the first implementation are still valid in the implementation, and will not be repeated here in order to reduce repetition. Correspondingly, the relevant technical details mentioned in the implementation may be applied in the first implementation.

A fourth implementation of the present disclosure relates to a network side device. The network side device includes following modules.

A signaling bit quantification module is used for determining a quantity N of bits of uplink control information to be received.

A first resource quantification module is used for determining a first quantity of resources according to a target code rate and N. In at least one implementation, the target code rate may be configured by the network side device. In at least one implementation, the target code rate may be predetermined according to a protocol.

A practical resource quantification module is used for determining a quantity of resources to be actually used according to the first quantity of resources and a quantity of preconfigured resources, wherein the quantity of the resources to be actually used is not greater than the quantity of the preconfigured resources.

A receiving module is used for receiving uplink control information through the quantity of the resources to be actually used.

There are many possibilities for the quantity of the preconfigured resources and the first quantity of resources, for example, a quantity of frequency domain resource blocks occupied by an uplink control channel, a quantity of resource elements occupied by an uplink control channel, etc.

There are many ways for determining the quantity of the preconfigured resources, for example, indicating through a higher layer signaling; or, preconfiguring at least one available resource through a higher layer signaling, and indicating one of the at least one available resource through downlink control information.

The practical resource quantification module has many ways for implementation. The following are examples.

In at least one implementation, when the practical resource quantification module determines that the first quantity of resources is not greater than the quantity of the preconfigured resources, the quantity of the resources to be actually used is equal to the first quantity of resources (assuming that the first quantity of resources is Q), wherein the resources to be actually used may be first Q resources, last Q resources, or Q resources in other agreed positions of the preconfigured resources, etc.

In at least one implementation, when the practical resource quantification module determines that the first quantity of resources is greater than the quantity of the preconfigured resources, the quantity of the resources to be actually used is equal to the quantity of the preconfigured resources. In this case, what the receiving module actually receives is the uplink control information (of N bits) to be received.

In at least one implementation, when the practical resource quantification module determines that the first quantity of resources is greater than the quantity of the preconfigured resources, a first quantity of bits of uplink control information is determined according to the target code rate and the quantity of the preconfigured resources. The quantity of the resources to be actually used is equal to the quantity of the preconfigured resources. In this case, what the receiving module actually receives is uplink control information after signaling compression.

In at least one implementation, when the practical resource quantification module determines that the first quantity of resources is greater than the quantity of the preconfigured resources, a first quantity of bits of uplink control information is determined according to the target code rate and the quantity of the preconfigured resources. A second quantity of resources is determined according to the target code rate and a quantity of bits of new uplink control information to be received, wherein the new uplink control information to be received is obtained after signaling compression is performed on the uplink control information to be received, and the quantity of bits of the new uplink control information to be received is not greater than the first quantity of bits of the uplink control information. The quantity of the resources to be actually used is equal to the second quantity of resources. In this case, what the receiving module actually receives is uplink control information after signaling compression.

The second implementation is a method implementation corresponding to the implementation, and the implementation may be implemented in cooperation with the second implementation. The relevant technical details mentioned in the second implementation are still valid in the implementation, and will not be repeated here in order to reduce repetition. Correspondingly, the relevant technical details mentioned in the implementation may be applied in the second implementation.

Various method implementations of the present disclosure may be implemented in software, hardware, firmware, etc. Whether the present disclosure is implemented in software, hardware or firmware, codes of instructions may be stored in any type of computer accessible memory (e.g., permanent or modifiable, volatile or nonvolatile, solid or non-solid, fixed or replaceable medium). Similarly, the memory may be, for example, a Programmable Array Logic (PAL), a Random Access Memory (RAM), a Programmable Read Only Memory (PROM), a Read-Only Memory (ROM), an electrically erasable programmable ROM (EEPROM), a magnetic disk, an optical disk, or a Digital Versatile Disc (DVD).

It should be noted that various units mentioned in various device implementations of the present disclosure are logical units. Physically, a logical unit may be a physical unit, a part of a physical unit, or a combination of multiple physical units. Physical implementations of these logical units are not the most important. A combination of functions implemented by these logical units is a key to solving the technical problem raised by the present disclosure. In addition, in order to highlight innovative parts of the present disclosure, the device implementations of the present disclosure do not introduce units that are not closely related to solving the technical problem raised by the present disclosure, which does not mean that there are no other units in the device implementations.

It should be noted that in the present disclosure documents of the patent, relational terms such as first and second etc. are only used to distinguish one entity or operation from another entity or operation, and do not necessarily require or imply any such actual relationship or order between these entities or operations. Moreover, the terms "include", "contain" or any other variation thereof are intended to cover a non-exclusive inclusion, such that a process, method, article, or device that includes a list of elements not only includes those elements but also includes other elements not expressly listed, or further includes elements inherent to such process, method, article, or device. Without further restrictions, an element defined by a statement "include one" does not exclude presence of another identical element in the process, method, article or device that includes the element. In the present disclosure document of the patent, if it is mentioned that an act is executed according to an element, it means that the act is executed according to at least the element, which includes two cases: the act is executed only according to the element, and the act is executed according to the element and another element. Multiple, multiple times, multiple types and other expressions include two, two times, two types, two or more, two times or more, two types or more.

All documents mentioned in the present disclosure are hereby incorporated by reference as if each document is individually incorporated by reference. In addition, it should be understood that after reading the teachings of the present disclosure, those skilled in the art may make various variations or modifications to the present disclosure, and these equivalent forms also fall within the scope of protection claimed in the present disclosure.

What is claimed is:

1. A method for determining uplink control channel resources, comprising:
    determining, by a terminal, a quantity N of bits of uplink control information to be transmitted;
    determining, by the terminal, a first quantity of physical resource blocks (PRBs) according to a target code rate and the N;
    determining, by the terminal, a quantity of PRBs to be actually used according to the first quantity of PRBs and a quantity of preconfigured PRBs, wherein the quantity of the PRBs to be actually used is not greater than the quantity of the preconfigured PRBs; and
    transmitting, by the terminal, uplink control information using the quantity of the PRBs to be actually used,
    wherein the quantity of the preconfigured PRBs is determined by indicating through a higher layer signaling.

2. The method for determining uplink control channel resources according to claim 1, wherein the target code rate is configured by a network side device.

3. The method for determining uplink control channel resources according to claim 1, wherein the quantity of the preconfigured PRBs and the first quantity of PRBs comprise:
    a quantity of PRBs occupied by an uplink control channel.

4. The method for determining uplink control channel resources according to claim 1, wherein determining, by the terminal, the quantity of the PRBs to be actually used according to the first quantity of PRBs and the quantity of the preconfigured PRBs, comprises:
    when the first quantity of PRBs is not greater than the quantity of the preconfigured PRBs, determining, by the terminal, that the quantity of the PRBs to be actually used is equal to the first quantity of PRBs.

5. The method for determining uplink control channel resources according to claim 4, wherein the terminal determines that the PRBs to be actually used are first Q PRBs of the preconfigured PRBs, and the Q is the first quantity of PRBs.

6. The method for determining uplink control channel resources according to claim 1, wherein determining, by the terminal, the quantity of the PRBs to be actually used according to the first quantity of PRBs and the quantity of the preconfigured PRBs, comprises:
    when the first quantity of PRBs is greater than the quantity of the preconfigured PRBs, determining, by the terminal, that the quantity of the PRBs to be actually used is equal to the quantity of the preconfigured PRBs.

7. The method for determining uplink control channel resources according to claim 1, wherein determining, by the terminal, the quantity of the PRBs to be actually used according to the first quantity of PRBs and the quantity of the preconfigured PRBs, comprises:
    determining, by the terminal, a first quantity of bits of uplink control information according to the target code rate and the quantity of the preconfigured PRBs when the first quantity of PRBs is greater than the quantity of the preconfigured PRBs.

8. The method for determining uplink control channel resources according to claim 7, wherein determining, by the terminal, the first quantity of bits of the uplink control information according to the target code rate and the quantity of the preconfigured PRBs, comprises:
    performing signaling compression on the uplink control information to be transmitted, and obtaining new uplink control information to be transmitted, wherein a quantity of bits of the new uplink control information to be transmitted is not greater than the first quantity of bits of the uplink control information.

9. The method for determining uplink control channel resources according to claim 8, wherein obtaining the new uplink control information to be transmitted, further comprises:
    the quantity of the PRBs to be actually used being equal to the quantity of the preconfigured PRBs.

10. A terminal, comprising a processor and a memory, wherein the memory is configured to store a computer program and the processor is configured to call and execute the computer program stored in the memory to perform:
    determining a quantity N of bits of uplink control information to be transmitted;
    determining a first quantity of physical resource blocks (PRBs) according to a target code rate and the N;
    determining a quantity of PRBs to be actually used according to the first quantity of PRBs and a quantity of preconfigured PRBs, wherein the quantity of the PRBs to be actually used is not greater than the quantity of the preconfigured PRBs; and
    transmitting uplink control information by using the quantity of the PRBs to be actually used,
    wherein the quantity of the preconfigured PRBs is determined by indicating through a higher layer signaling.

11. The terminal according to claim 10, wherein the target code rate is configured by a network side device; and
    the quantity of the preconfigured PRBs and the first quantity of PRBs comprise:
    a quantity of PRBs occupied by an uplink control channel.

12. The terminal according to claim 10, wherein when the first quantity of PRBs is not greater than the quantity of the preconfigured PRBs, the quantity of the PRBs to be actually used is equal to the first quantity of PRBs.

13. The terminal according to claim 12, wherein the terminal determines that the PRBs to be actually used are first Q PRBs of the preconfigured PRBs, and the Q is the first quantity of PRBs.

14. The terminal according to claim 10, wherein when the first quantity of PRBs is greater than the quantity of the preconfigured PRBs, the quantity of the PRBs to be actually used is equal to the quantity of the preconfigured PRBs.

15. The terminal according to claim 10, wherein the processor is further configured to call and execute the computer program stored in the memory to perform:
    determining a first quantity of bits of uplink control information according to the target code rate and the quantity of the preconfigured PRBs when the first quantity of PRBs is greater than the quantity of the preconfigured PRBs.

16. The terminal according to claim 15, wherein the processor is further configured to call and execute the computer program stored in the memory to perform:

performing signaling compression on the uplink control information to be transmitted, and obtaining new uplink control information to be transmitted, wherein a quantity of bits of the new uplink control information to be transmitted is not greater than the first quantity of bits of the uplink control information.

17. The terminal according to claim 16, wherein the quantity of the PRBs to be actually used is equal to the quantity of the preconfigured PRBs; or the terminal determines a second quantity of PRBs according to the target code rate and the quantity of bits of the new uplink control information to be transmitted; wherein the quantity of the PRBs to be actually used is equal to the second quantity of PRBs.

18. A network side device, comprising a processor and a memory, wherein the memory is configured to store a computer program and the processor is configured to call and execute the computer program stored in the memory to perform:

determining a quantity N of bits of uplink control information to be received;

determining a first quantity of physical resource blocks (PRBs) according to a target code rate and the N;

determining a quantity of PRBs to be actually used according to the first quantity of PRBs and a quantity of preconfigured PRBs, wherein the quantity of the PRBs to be actually used is not greater than the quantity of the preconfigured PRBs; and receiving uplink control information using the quantity of the PRBs to be actually used, wherein the quantity of the preconfigured PRBs is determined by indicating through a higher layer signaling.

* * * * *